United States Patent
Khan et al.

(10) Patent No.: US 7,135,797 B2
(45) Date of Patent: Nov. 14, 2006

(54) FLUID DYNAMIC BEARING WITH WEAR RESILIENT SURFACE

(75) Inventors: Raquib Uddin Khan, Pleasanton, CA (US); Mohammad Mahbubul Ameen, Campbell, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/683,816

(22) Filed: Oct. 9, 2003

(65) Prior Publication Data

US 2004/0233576 A1  Nov. 25, 2004

Related U.S. Application Data

(60) Provisional application No. 60/473,044, filed on May 22, 2003.

(51) Int. Cl.
*H02K 5/16* (2006.01)
(52) U.S. Cl. ..................... 310/90; 310/67 R
(58) Field of Classification Search ............ 310/67 R, 310/90; 360/99.08, 99.03, 99.04, 99.09; 384/100, 107, 113, 913
See application file for complete search history.

(56) References Cited

U.S. PATENT DOCUMENTS

| | | | | |
|---|---|---|---|---|
| 5,622,434 A | * | 4/1997 | Takahashi | 384/49 |
| 5,971,617 A | * | 10/1999 | Woelki et al. | 384/295 |
| 6,271,612 B1 | | 8/2001 | Tanaka et al. | |
| 6,528,909 B1 | * | 3/2003 | Kan et al. | 310/52 |
| 6,552,456 B1 | * | 4/2003 | Goto et al. | 310/90 |
| 2003/0048574 A1 | * | 3/2003 | Khan et al. | 360/99.08 |
| 2003/0077011 A1 | * | 4/2003 | Hall | 384/126 |
| 2003/0123763 A1 | * | 7/2003 | Takahashi | 384/100 |

* cited by examiner

*Primary Examiner*—Thanh Lam
(74) *Attorney, Agent, or Firm*—Wax Law Group

(57) ABSTRACT

A system and means is provided for preserving bearing surfaces and maintaining bearing life, for use with spindle motors. In an aspect, adhesive and abrasive wear is minimized, corrosion is reduced, and bearing dynamic performance and fluid purity is maintained. In an aspect, a silicon containing copper alloy is utilized for one bearing surface and a stainless steel is utilized for an adjacent surface. The present invention also satisfies considerations including hardness, thermal expansion, thermal conductivity and use with grooved surfaces.

21 Claims, 5 Drawing Sheets

FLUID DYNAMIC BEARING WITH WEAR RESILIENT SURFACE

CROSS REFERENCE TO RELATED APPLICATION

This application is based on a provisional application 60/473,044, filed May 22, 2003, entitled Low Cost Fluid Dynamic Bearing With Silicon Containing Copper Alloy For Prolonged Motor Life For Data Storage Application, and assigned to the Assignee of this application and incorporated herein by reference.

FIELD OF THE INVENTION

The invention relates generally to spindle motors, and more particularly to a wear resilient surface for hydrodynamic bearing assemblies that provide support and rotation for spindle components in disc drive data storage systems.

BACKGROUND OF THE INVENTION

Disc drive memory systems are widely employed in traditional computing environments and more currently in additional environments. These systems are used by computers and devices including digital cameras, digital video recorders, laser printers, photo copiers, jukeboxes, video games and personal music players. Consequently, the demands on disc drive memory systems has intensified. Disc drive memory systems store digital information that is recorded on concentric tracks of a magnetic disc medium. Several discs are rotatably mounted on a spindle, and the information, which can be stored in the form of magnetic transitions within the discs, is accessed using read/write heads or transducers. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the shaft. One type of motor is known as an in-hub or in-spindle motor, which typically has a spindle mounted by means of a bearing system to a motor shaft disposed in the center of the hub. The bearings permit rotational movement between the shaft and the hub, while maintaining alignment of the spindle to the shaft. The read/write heads must be accurately aligned with the storage tracks on the disc to ensure the proper reading and writing of information.

In the past, spindle motors used conventional ball bearings between the hub and the shaft. However, the demand for increased storage capacity and smaller disc drives has led to the read/write head being placed increasingly close to the disc surface. The close proximity requires that the disc rotate substantially in a single plane. A slight wobble or run-out in disc rotation can cause the disc to strike the read/write head, possibly damaging the disc drive and resulting in loss of data. Further, resistance to mechanical shock and vibration is poor in the case of ball bearings, because of low damping. Because this rotational accuracy cannot be achieved using ball bearings, disc drives currently utilize a spindle motor having fluid dynamic bearings on the shaft and a thrust plate to support a hub and the disc for rotation. One alternative bearing design is a hydrodynamic bearing. In a hydrodynamic bearing, a lubricating fluid such as gas or liquid provides a bearing surface between a stationary member and a rotating member of the disc drive. Wobble or run-out is reduced between the relatively rotating members, and the use of fluid in the interface causes a damping effect. While ball bearings utilize a series of point interfaces, hydrodynamic bearings spread the bearing interface over a large surface area.

Since adjacent gap surfaces of a hydrodynamic bearing are not mechanically separated, a potential for rubbing, wear and impact exists, which can effect bearing performance, reduce bearing life and destroy a bearing. Further, it has become essential in the industry to require disc drives to withstand substantial mechanical shock, one concern being the handling of mobile applications such as laptop computers.

Bearing life is one of the most crucial factors in designing any fluid dynamic bearing. Removal of surface material by wear can change the effective bearing gap, which can change bearing performance. The dynamic performance of a hydrodynamic motor is a function of the bearing gap since gap pressure affects dynamic performance, and hydrodynamic and hydrostatic bearings utilize pressures. Further, during the start-stop cycle of the fluid dynamic bearing motor, one or more adjacent surfaces of the bearing come into contact thus causing adhesive or abrasive wear. The worn metal particles are highly reactive in nature and can act as a catalyst to an oil oxidation process potentially resulting in sludge formation, etc. Also, the worn metal particles themselves can cause surface wear. Moreover, water content may exist in a bearing, resulting in corrosive wear of a bearing surface. Material from a surface of the bearing can break away, which can result in a change in bearing performance, bearing failure, or even be expelled from the region surrounding the motor and damage the disc recording surface.

A key factor that affects bearing life is the selection of the material interface between two adjacent or rubbing surfaces. One method to protect a bearing surface is to apply a hard coating to the surface. An example of such coating is DLC or amorphous carbon, which when comes into contact with other metallic surfaces produces a negligible amount of worn metal, thus allowing a long bearing life. However, the coating process is expensive due in part to handling issues, since a bearing has small parts. Further, coating bearing gap surfaces (i.e. shaft or sleeve surface) may result in a coating thickness variation, a taper, and a variable bearing gap. A bearing gap, in particular sections, must remain uniform and constant. When the bearing gap varies, nonrepetitive runout (NRRO), as well as other bearing performances are effected. Further, there is a trend to decrease the aspect ratio (depth to width ratio) in sleeves to achieve greater recording densities, making precise coating more difficult and expensive. Additionally, gap variations may be specified in design, making a coating process even further difficult. Thus, what is needed is a method or suitable bearing material to preserve bearing surfaces and maintain bearing life.

SUMMARY OF THE INVENTION

A wear resilient surface and interface system and method is provided for spindle motors having adjacent or relatively rotating surfaces. As understood by those skilled in the art, wear acceptability, for example between adjacent surfaces of a shaft and sleeve in the case of a fluid dynamic bearing for disc drives, is drive dependent. In some disc drives the acceptable wear is a few micrograms, and in other drives the acceptable wear is 10 to 100 micrograms. The present invention provides, in an embodiment, a system and method that ensures no observable or negligible wear to bearing surfaces. Bearing life is prolonged, a desired gap pressure, bearing dynamic performance and bearing fluid purity is maintained.

An embodiment of the invention utilizes a material that is readily available, relatively low in cost as compared to conventionally used materials, relatively uncomplicated in machining characteristics, and allows for further machining including grooved surface bearing designs.

In an embodiment, reduction or minimization of adhesive and abrasive wear is provided. In an embodiment, reduction or minimization of corrosion is also provided. Metal particle generation in bearing fluid is also reduced or minimized, thereby providing for extended bearing life. Additionally, in an embodiment, bearing resistance to high temperature oxidation is provided.

In an embodiment, the system and method can be employed with fluid dynamic bearing assemblies that provide support and rotation for spindle components in disc drive data storage systems. In an embodiment, the system and method can be employed with other surfaces that experience wear. For example, other surfaces that may come into contact or are positioned adjacent to each other. Further, the material utilized by an embodiment of the invention can be used with conventionally used bearing fluids (including gas), and further exhibits a thermal expansion coefficient that compensates for thermal changes in a bearing.

Features of the invention are achieved by utilizing interface materials having favorable and complementary tribological properties. In one embodiment, a silicon-containing copper alloy is utilized for one surface and a stainless steel is utilized for an adjacent surface to preserve a bearing. In an embodiment, at least one bearing surface includes silicon bronze.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known compounds, compositions, materials, elements, devices, components, methods, process steps and the like may not be set forth in detail in order to avoid obscuring the invention.

A system and means of preserving an interface of adjacent materials is described herein. Many benefits can result by utilizing embodiments of the present invention including a longer bearing life, preservation of bearing fluid, and savings in manufacturing costs. Features of the discussion and claims may be applied to spindle motors, in an embodiment. Further applications of the invention include use with fluid dynamic bearings, ball bearings, hydrodynamic bearings, hydrostatic bearings and other surfaces that potentially experience surface-to-surface wear. Those skilled in the art will recognize additional related applications of and uses for embodiments of the invention, beyond disc drives data storage devices and spindle motors.

Figure 1:
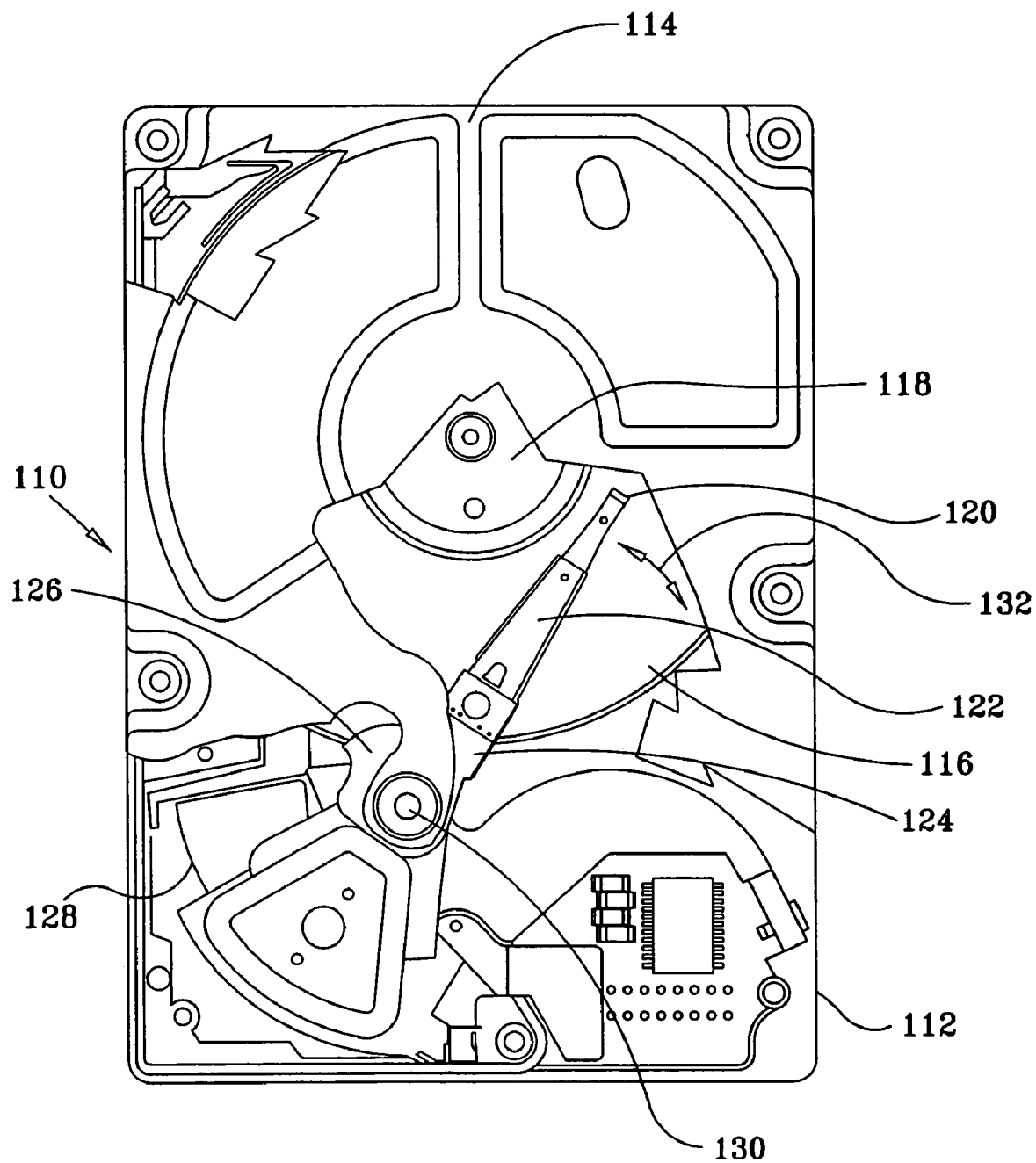
FIG. 1 is a top plain view of a disc drive data storage system in which the present invention is useful, in an embodiment.

Referring to the drawings wherein identical reference numerals denote the same elements throughout the various views, FIG. 1 illustrates a typical disc drive data storage device 110 in which the present invention is useful. Clearly, features of the discussion and claims are not limited to this particular design, which is shown only for purposes of the example. It will be readily apparent that the present invention may be applied to disc drives, spindle motors, and other motors having a stationary and a rotatable component. The embodiments discussed below can be used in systems where rotation between components exists, even if the components rotate in the same direction. Further, embodiments of the invention may be applied to a variety of adjacent surfaces, other than relatively rotatable or stationary components.

Disc drive 110 includes housing base 112 that is combined with cover 114 forming a sealed environment. Disc drive 110 further includes disc pack 116, which is mounted for rotation on a spindle motor (not shown) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arcuate path 132. This allows heads 120 to read and write magnetically encoded information on the surfaces of discs 116 at selected locations.

Figure 2:
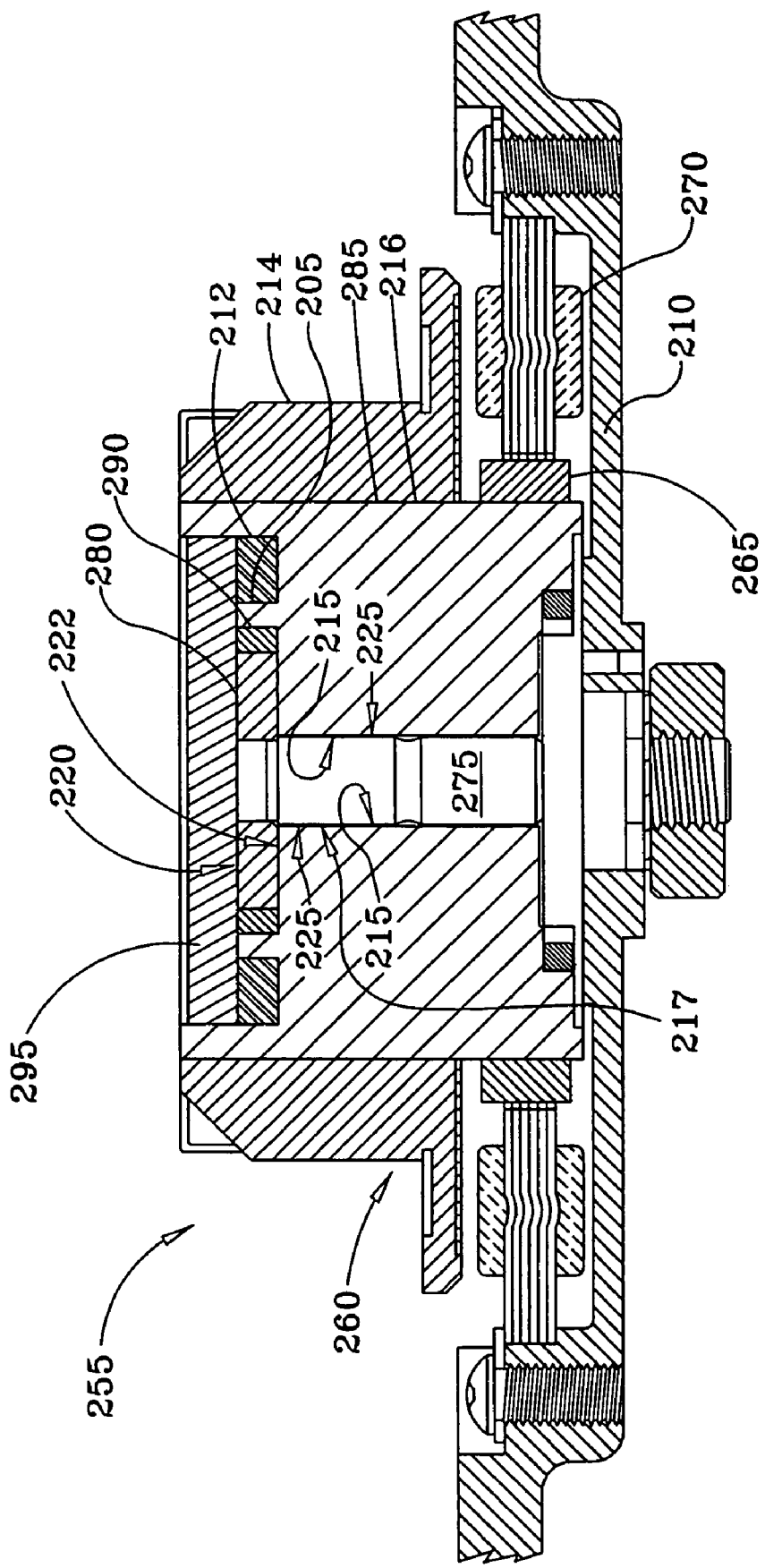
FIG. 2 is a sectional side view of a hydrodynamic bearing spindle motor, which the present invention is useful, in an embodiment.

FIG. 2 is a sectional side view of a hydrodynamic bearing spindle motor 255 used in disc drives 110 in which the present invention is useful. Typically, spindle motor 255 includes a stationary component and a rotatable component. The stationary component includes shaft 275 that is fixed and attached to base 210. The rotatable component includes hub 260 having one or more magnets 265 attached to a periphery thereof. The magnets 265 interact with a stator winding 270 attached to the base 210 to cause the hub 260 to rotate. Core 216 is formed of a magnetic material and acts as a back-iron for magnets 265. Magnet 265 can be formed as a unitary, annular ring or can be formed of a plurality of individual magnets that are spaced about the periphery of hub 260. Magnet 265 is magnetized to form one or more magnetic poles. It is to be appreciated that spindle motor 255 can employ a fixed shaft as shown in FIG. 2, or a rotating shaft. In a rotating shaft spindle motor, the bearing is located between the rotating shaft and an outer stationary sleeve that is coaxial with the rotating shaft.

The hub 260 is supported on a shaft 275 having a thrustplate 280 on one end. The thrustplate 280 can be an integral part of the shaft 275, or it can be a separate piece which is attached to the shaft, for example, by a press fit. The shaft 275 and the thrustplate 280 fit into a sleeve 285 and a thrustplate cavity 290 in the hub 260. A counter plate 295 is provided above thrustplate 280 resting on an annular ring 205 that extends from the hub 260. Counterplate 295 provides axial stability for the hydrodynamic bearing and positions hub 260 within spindle motor 255. An O-ring 212 is provided between counterplate 295 and hub 260 to seal the hydrodynamic bearing and to prevent hydrodynamic fluid from escaping.

Hub 260 includes a central core 216 and a disc carrier member 214, which supports disc pack 116 (shown in FIG. 1) for rotation about shaft 275. Disc pack 116 is held on disc carrier member 214 by disc clamp 118 (also shown in FIG. 1). Hub 260 is interconnected with shaft 275 through hydrodynamic bearing 217 for rotation about shaft 275. Bearing 217 includes radial surfaces 215 and 225 and axial surfaces 220 and 222.

A fluid, such as lubricating oil or a ferromagnetic fluid fills interfacial regions between the shaft 275 and the sleeve 285, and between the thrustplate 280 and the thrustplate cavity 290 and the counter plate 295. Although the present figure is described herein with a lubricating liquid, those skilled in the art will appreciate that a lubricating gas can be used.

In order to promote the flow of fluid over the bearing surfaces which are defined between the thrust plate 280 and the counterplate 295; between the thrust plate 280 and the sleeve 285; and between the shaft 275 and the sleeve 285, typically one of the two opposing surfaces of each such assembly carries sections of pressure generating grooves (not shown). The effective operation of the pressure generating grooves depends in part on the bearing gap being within a specified tolerance. A bearing surface having a specified bearing gap tolerance can be achieved and preserved by utilizing an embodiment of the present invention.

Figure 3A:
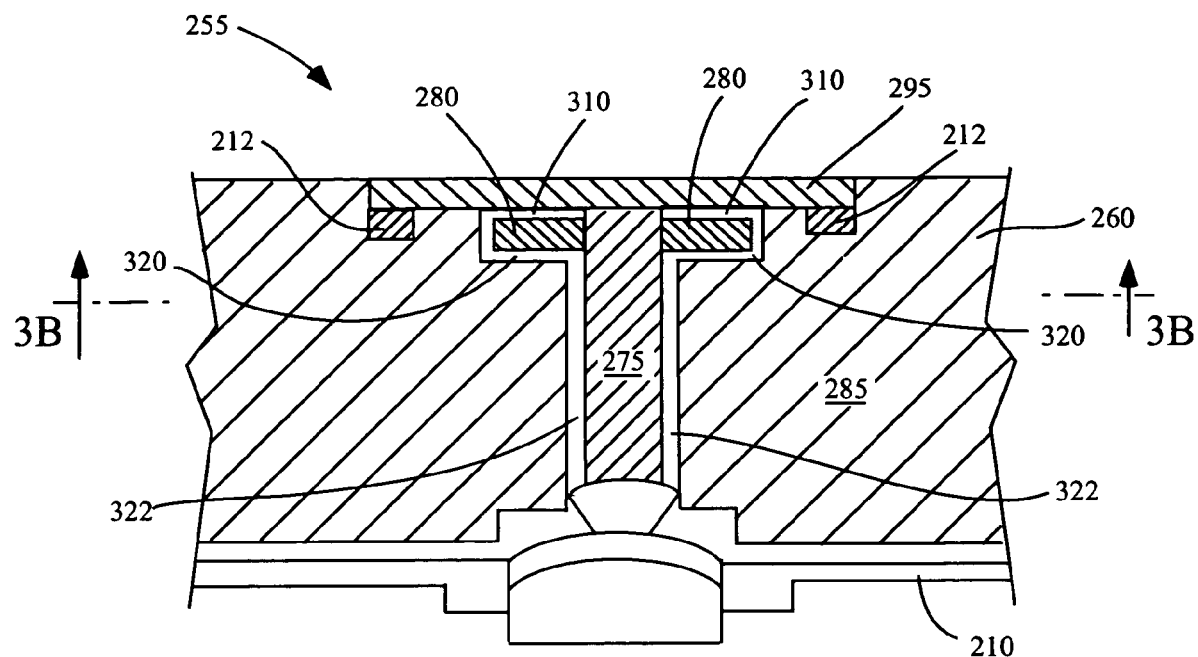
FIG. 3A is another sectional side view of the hydrodynamic bearing spindle motor of FIG. 2, with the bearing gap enlarged for visual illustrative purposes.

Referring to FIG. 3A, a view of a bearing gap of hydrodynamic bearing 217 of FIG. 2 is enlarged and emphasized for illustrative purposes, bearing gaps in many cases being in the range of several microns. As may be observed, a fluid gap 310 exists between adjacent surfaces of counterplate 295 and thrustplate 280. Also, a fluid gap 320 exists between adjacent surfaces of thrust plate 280 and sleeve 285. Additionally, a fluid gap 322 exists between adjacent surface of shaft 275 and sleeve 285. Wherever a gap exists, a potential for adjacent surface wear exists.

To achieve preservation of hydrodynamic bearing 217 (FIG. 2), a suitable pair of components having adjacent surfaces (a surface and a counter surface) is selected. For example, any one of or all of shaft 275, sleeve 285, thrustplate 280, counterplate 295 and hub 260 may be selected. In an embodiment, sleeve 285 is formed of silicon containing copper alloy. In another embodiment, shaft 275 is formed of silicon containing copper alloy. Additionally, components other than bearing surfaces that potentially experience surface-to-surface wear may also be selected. It is to be appreciated that an entire component may be comprised of silicon containing copper alloy or a predetermined portion of a component may be comprised of silicon containing copper alloy. For example, sleeve 285 or a predetermined portion of sleeve 285 may be formed of silicon containing copper alloy.

In an embodiment, one surface is selected for silicon containing copper alloy and a counter surface is selected for stainless steel. In another embodiment, both adjacent surfaces are selected for silicon containing copper alloy. The entire contacting bearing surface or a predetermined portion of the surface can be comprised of silicon containing copper alloy. It is to be appreciated that embodiments of the invention can be utilized with known coating processes including a carbon or diamond like carbon (DLC) coating. As an example, one surface may be selected for silicon containing copper alloy and a counter surface coated with DLC.

Silicon Containing Copper Alloys

The silicon containing copper alloy as described herein is not limited to any specific chemical composition percentage of silicon. In an embodiment of the present invention, the chemical composition percentage of silicon utilized may range from 0.2 percent to 10 percent. In an embodiment, high-silicon bronze A (product description C65500) is utilized, the silicon composition ranging from about 2.8% to 3.8%. Experiments conducted show that about 3% silicon chemical composition is useful, and that 1.5% to 2% silicon (a lower quantity of silicon) may also be utilized. In another embodiment, silicon bronzes having product designations C64200 (aluminum silicon bronze), C64700 to C6619 (copper-silicon alloys, including silicon brasses) and C65100 (silicon bronze) can be utilized as a bearing surface.

Stainless Steels

Four categories of stainless steels include austenitic, ferritic, ferritic-austenitic (duplex) and martensitic. In some applications, the invention may utilize any of these stainless steels as a counter surface to silicon containing copper. SF20T (a ferritic stainless steel) is utilized as a bearing counter surface in one embodiment. Commonly available stainless steels that are relatively undemanding to machine may be utilized, in some embodiments, along with a counter surface of silicon containing copper alloy. Ferritic steel exhibits moderate to good corrosion resistance and has a chromium content between 11% and 18%, chromium making steel stainless by improving corrosion resistance. In one embodiment of the present invention, free machining 430SS is utilized as a counter surface to silicon containing copper.

Hardness

Silicon containing copper alloys, including silicon bronze, exhibit acceptable hardness for use with bearing gap surfaces in spindle motors. Hardness is the property of a material that enables it to resist plastic deformation, usually penetration. Hardness also includes resistance to wear, bending, scratching, abrasion and cutting, all considerations in design of a bearing. In the design of bearing surfaces, silicon containing copper alloys also exhibit acceptable hardness with regard to Rockwell hardness, Vickers Hardness, Brinell hardness, and other standard test methods for expressing the relationship between hardness and size of impression (i.e., indenting a material). Further, silicon containing copper alloys, including silicon bronze, exhibit exceptional shear strength, fatigue strength and izod impact strength, with regard to use with bearing components.

Silicon bronze exhibits acceptable hardness for use with bearing gap surfaces thereby reducing or minimizing adhesive and abrasive wear to adjacent bearing surfaces. Adhesive wear occurs when adjacent surfaces contact or adhere or have point-to-point contact. Abrasive wear occurs when particles, for example existing particles in a bearing fluid or adhesive wear particles, act to abrade a bearing surface. Adhesive and abrasive wear does not as used herein, include localized welding or affixed adjacent surfaces where motor power is insufficient to continue rotation. As an example, when relative rotation between shaft 275 and sleeve 285 stops, there will be a tendency for the pair to lean toward or even rest against the adjacent surface. As the rotation of the bearing continues, stops and starts, physical contact between opposing surfaces of one or more bearing sections may occur. Also, upon startup until some speed of relative rotation has been established and fluid pressure created between opposing surfaces, some grinding or scraping of one surface relative to the other may occur. This could produce metallic particles afloat in the fluid; alternatively it could scar or groove the surface, reducing the effectiveness and life of the hydrodynamic bearing.

Thermal Expansion Coefficient

Silicon containing copper alloys exhibit acceptable thermal expansion coefficients in the design of bearing gap surfaces in spindle motors. Thermal expansion is the expansion in metal resulting from an increase in temperature. In particular, silicon bronze has an acceptable thermal expansion coefficient of $10.0 \times 10^{-6}$ per °F.(68–572 F). Expansion and contraction of a bearing surface material is advantageous in some cases. That is, a bearing gap is typically very thin, on the order of 4 to 6 micro meters, and with such small dimensions, the stiffness of the bearing is sensitive to changes in temperature since the viscosity of bearing fluid will typically change with temperature and change in bearing gap. The operating temperature of a typical motor for example may range from 5 to 90 degrees C. To account for these changes in viscosity, it is desirable to cause the gap to decrease as temperature goes up above some median level, and to increase at lower temperatures. It is therefore desirable to utilize bearing surface material(s) in the design of a bearing in which one of the two surfaces defining the bearing gap moves or is deformed to be closer to the other surface and reduce the bearing gap as temperature goes up from some nominal level. It is also desirable to have that same surface material(s) move slightly further away as the temperature is reduced so that as viscosity of the fluid in the gap increases, the combination of the gap which is now slightly wider and the viscosity which is higher, maintains substantially the same level of stiffness. Embodiments of this invention can be incorporated in U.S. Pat. No. 6,065,877, entitled Thermal Compensation For Fluid Dynamic Bearing Using Bimetal Parts; that patent is incorporated herein by reference.

Thermal Conductivity

In selecting surface materials for a bearing gap, thermal conductivity is a further consideration in the design of a bearing gap, for example in the design of a bearing gap that is thermally adjustable. Thermal conductivity, the measure a materials ability to conduct heat, is the rate that heat flows through a material and metal electrons add to the flow of heat. Silicon containing copper alloys exhibit acceptable thermal conductivity in the design of bearing gap surfaces in spindle motors. In particular, silicon bronze has an acceptable thermal conductivity of 20 Btu/ft$^2$/hr/°F.(35 W/m•° K.).

Fluids

Conventional bearing fluids may be utilized with embodiments of the invention. For example, synthetic ester bearing fluids (ST4J51) may be utilized with a silicon containing copper alloy surface and stainless steel counter surface. Other fluids that may be utilized with embodiments of the present invention include poly-alpha olefin (PAO), mineral hydrocarbons, synthetic hydrocarbons, etc.

Contact Start/Stop

Figure 3B:
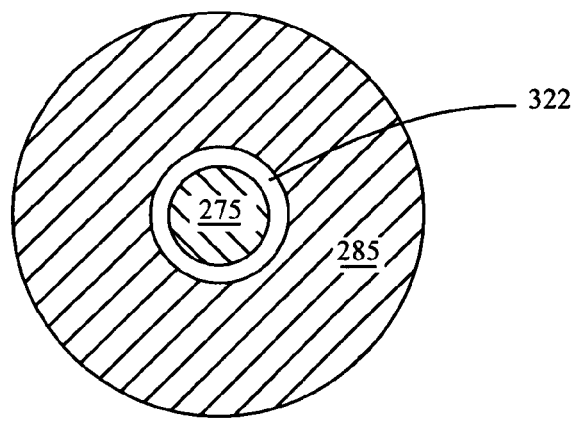
FIG. 3B is a diagrammatic sectional view of the hydrodynamic spindle motor taken along the 3B line of FIG. 3A, with portions removed for clarity.

As can be seen from an inspection of FIG. 3B, bearing gap 322 represents an area in which the surface of shaft 275 and sleeve 285 will eventually come into physical contact resulting in adhesive and abrasive wear. While contact may result due to shock events, contact also results during a typical contact stop/start (CSS). In operation, and as referred to herein, a typical CSS commences when a data transducing head 120 (FIG. 1) begins to slide against the surface of the disk as the disk begins to rotate. Upon reaching a predetermined high rotational speed, the head 120 floats in air at a predetermined distance from the surface of the disk where it is maintained during reading and recording operations. Upon terminating operation of the disk drive, the head 120 again begins to slide against the surface of the disk and eventually stops in contact with and pressing against the disk. Each time the head 120 and disk assembly is driven, the sliding surface of the head 120 repeats the cyclic operation consisting of stopping, sliding against the surface of the disk, floating in the air, sliding against the surface of the disk and stopping. The present invention is useful, in part, to minimize or prevent any effects that CSS might have on bearing surfaces. That is, when the head 120 is in contact with the disk, the bearing surfaces are similarly in contact, for example, adjacent surfaces of shaft 275 and sleeve 285. Wear can result when the bearing surfaces are in contact, and the use of silicon containing copper alloy provided by an embodiment of the present invention ensures negligible wear or no wear on the contacting bearing surfaces.

ECM Grooving

Embodiments of the present invention can also be utilized with bearing gap surfaces designed for having grooves (i.e. electrochemical machining grooves) and further resists wear to the grooves. For example, a bearing surface consisting of silicon bronze and a counter surface consisting of stainless steel may be utilized with a bearing surface designed for having grooves. These grooves are dynamic pressure-generating grooves formed on a bearing surface to generate a localized area of high pressure and provide a transport mechanism for fluid or air to more evenly distribute fluid pressure within a bearing and between rotating surfaces, enabling a spindle to rotate with more accuracy.

Figure 4A:
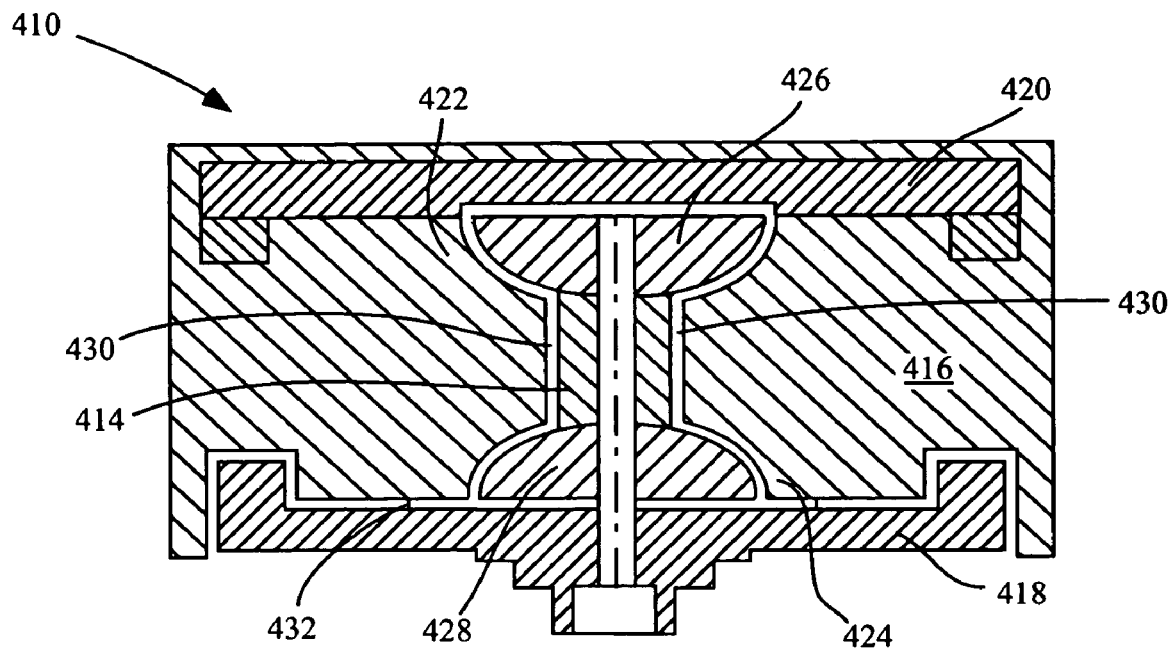
FIG. 4A is a sectional view of a hydrodynamic bearing with conical bearing surfaces, with the bearing gap enlarged for visual illustrative purposes, in which the present invention is useful, in an embodiment.
Figure 4B:
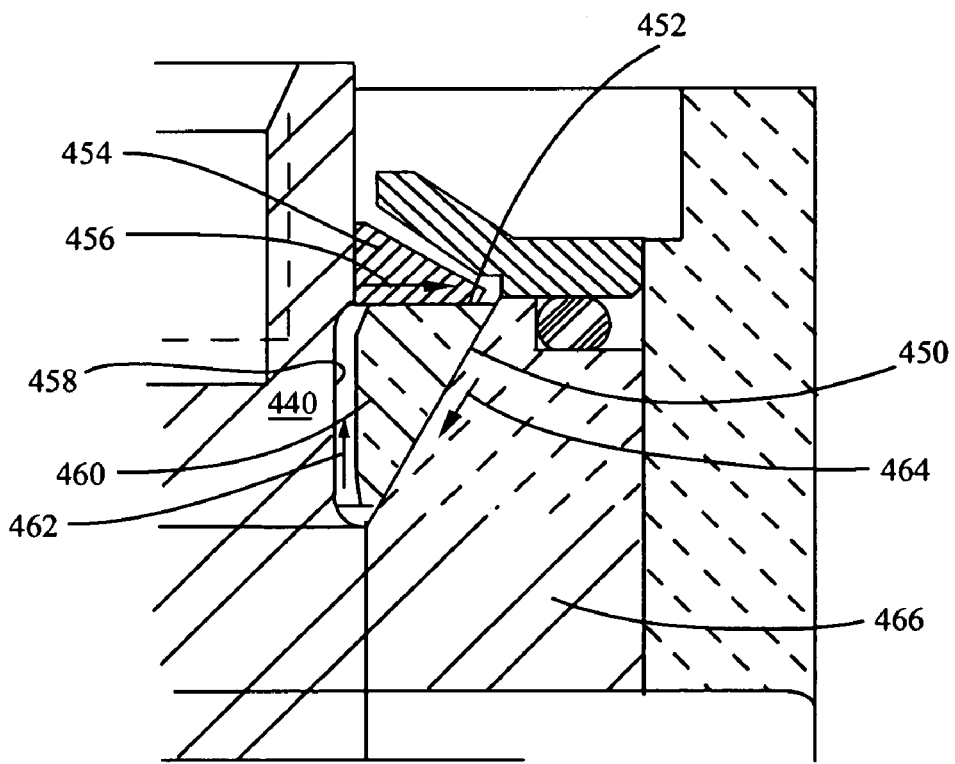
FIG. 4B is a sectional view of the upper right quadrant of a bearing cartridge in a hydrodynamic spindle motor, showing one half of the upper bearing cone, in which the present invention is useful, in an embodiment.

Embodiments of the present invention can further be utilized with conical bearing designs including those shown in FIG. 4A and FIG. 4B. FIG. 4A shows a cross sectional view of a drive spin spindle assembly of a type that can be supported from the base of the housing of a system using a hydrodynamic bearing cartridge. The figure relates to U.S. Pat. No. 5,559,651, which is assigned to the assignee of the present application and is incorporated herein by reference. The view of the bearing gap in FIG. 4A is enlarged for visual purposes, bearing gaps in many cases being in the range of several microns.

As may be observed, spindle motor 410 includes fluid gap 430 (enlarged for conception purposes) that exists between adjacent bearing surfaces, the bearing surfaces will eventually come into physical contact resulting in adhesive and abrasive wear. Shaft 414 and sleeve 416 are separated by fluid gap 430. Fluid also is situated between the upper hemisphere of concave receptacle 422 of sleeve 416 and the upper hemisphere of convex portion 426 of sleeve 416. Similarly, fluid is situated between the lower hemisphere of convex portion 428 of shaft 414 and the lower hemisphere of concave receptacle 424 of sleeve 416. Also, fluid gap 430, having capillary seal 432, is situated between upper hemisphere 426 and counterplate 420. Similarly, fluid gap 430 is situated between lower hemisphere 428 and base 418. Wherever a gap exists (fluid filled or otherwise), a potential for adjacent surface wear exists. In this bearing design, embodiments of the present invention can be selected or utilized (i.e., silicon containing copper alloy) on appropriate surfaces and components that may experience wear. For example, in appropriate conical designs, one bearing surface can be comprised of silicon bronze and the adjacent bearing surface can be comprised of stainless steel. The importance of embodiments of the present invention become even more apparent when considering surfaces such as adjacent surfaces sleeve 416 and base 418 that are situated beyond capillary seal 432. Here, in many cases, only gas or air fills the gap, reducing the cushioning effect that may be provided by a fluid.

FIG. 4B illustrates another conical bearing design that can be utilized with embodiments of the present invention. Arrow 456, arrow 462 and arrow 464 indicate the direction of oil flow about bearing cone 460. Adjacent surfaces include bearing cone 460 and bearing seat 466 with outer channel 450 there between, bearing cone 460 and shaft 440 with inner channel 458 between, and bearing cone 460 and seal cone 454 with upper channel 452 there between. As shown, adjacent bearing surfaces that may experience wear include bearing seat 466, bearing cone 460, shaft 440 and seal cone 454. In an embodiment, silicon containing copper alloy such as silicon bronze is utilized for the material of at least one of the bearing surfaces, and a stainless steel is utilized for a counter surface. Preservation of the bearing surfaces can thereby be achieved.

Dynamic Performance

Figure 5:
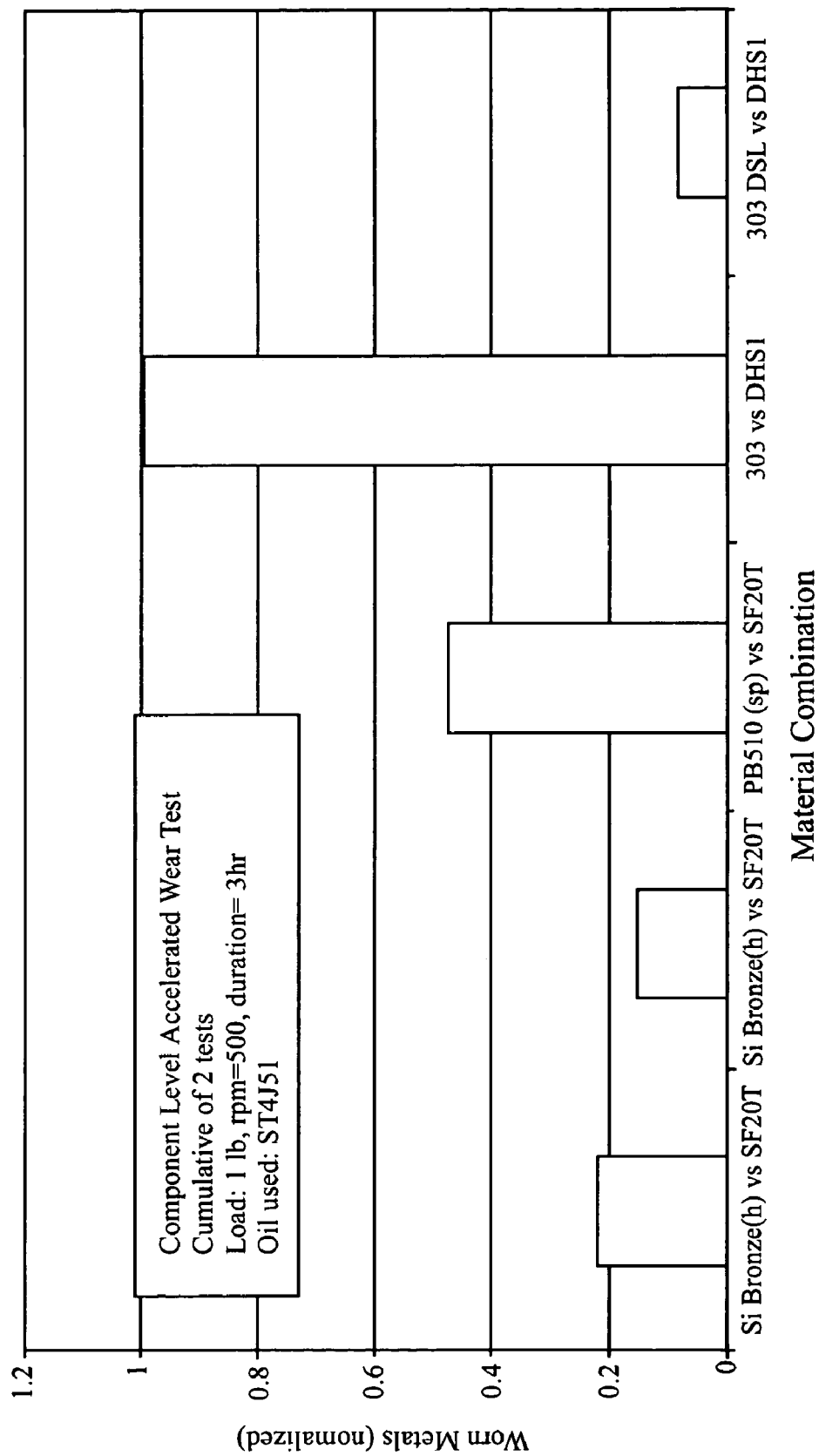
FIG. 5 is a graphical representation of component level accelerated wear test results, illustrating an embodiment of the present invention compared with other material combinations.

The dimensions of a spindle motor bearing gap between a rotating component and a stationary component must be tightly controlled and maintained to obtain good dynamic performance. Gap design tolerance is achieved by providing a bearing gap within specified dimensions (tolerance). Further, gap design tolerance is maintained by providing a bearing surface pair (i.e. shaft and sleeve, or shaft and cone) that ensures negligible wear or no observable wear on contacting bearing surfaces. As discussed herein, negligible wear is wear that has no clearly observable effect on bearing performance, given metal testing. A showing of material wear is illustrated in FIG. 5, including a showing of negligible wear for material combinations of silicon bronze and SF20T.

A further understanding of the above description can be obtained by reference to the following specific wear tests that are provided for illustrative purposes and are not intended to be limiting. FIG. 5 presents an example of an effect that an embodiment of the present invention has on material wear rates (adhesive wear and abrasive wear) on a component level, which simulates a motor level touch down. The graph shows component level accelerated wear tests for several material combinations. Material combinations are plotted showing worn metals (normalized). The testing conditions include a cumulative of two tests, ST4J51 bearing fluid, a load of 1 lb., 500 rpm, and a 3 hour duration.

A decrease in wear rate results for adjacent surfaces of a spindle motor, when utilizing silicon bronze on one surface and SF20T on a counter surface, as in an embodiment of the present invention. In this example test, the wear rate decreases by a factor of about 5.2, when utilizing silicon bronze and SF20T, as described above. Specifically, silicon bronze and SF20T exhibit wear rates of about 0.19 (an average of illustrated wear rates 0.22 and 0.16) when utilized in a spindle motor as a wear couple. Whereas, steels SS 303 and DHS1 exhibit wear rates of 1.0 when utilized in a spindle motor as a wear couple. Further, the material combination of phosphor bronze (PB510) and SF20T exhibit a wear rate of about 0.484, which is more than double the wear rate of the silicon bronze and SF20T material couple. It is to be appreciated that a decrease in wear rate provided by embodiments of the present invention can apply to an operational and rotating spindle motor and also to a non-rotating spindle motor, whether or not operational.

Having disclosed exemplary embodiments, modifications and variations may be made to the disclosed embodiments while remaining within the spirit and scope of the invention as defined by the appended claims. Further, although the present invention has been described with reference to components for disc drive storage systems and spindle motor assemblies, those skilled in the art will recognize that features of the discussion and claims may be utilized with other systems and components employing adjacent surfaces that may potentially experience surface-to-surface wear wherein maintaining a constant and unmarked material surface is of concern.

We claim:

1. A disc drive storage system comprising:
a housing having a central axis;
a stationary component that is fixed with respect to the housing and coaxial with the central axis;
a rotatable component that is rotatable about the central axis with respect to the stationary component;
a data storage disc attached to and coaxial with the rotatable component;
an actuator supporting a head proximate to the data storage disc for communicating with the disc; and
a bearing defining a gap and interconnecting the stationary component and the rotatable component and having surfaces separated by a lubricant, wherein at least one of the stationary component and the rotatable component is substantially comprised of silicon containing copper alloy, wherein the silicon containing copper alloy consists of silicon bronze.

2. The disc drive storage system as in claim 1, wherein one of the stationary component and the rotatable component comprises one of a shaft, sleeve, hub, counterplate, thrustplate, conical shaft, and a conical sleeve.

3. The disc drive storage system as in claim 1, wherein the silicon containing copper alloy is a wear resilient material for achieving negligible adhesive and abrasive wear to components, desired bearing gap dynamic performance, and component corrosion resistance.

4. The disc drive storage system as in claim 1, wherein the silicon bronze has a silicon composition ranging from 0.2% to 10%.

5. The disc drive storage system as in claim 1, wherein the silicon bronze is one of high-silicon bronze A having product description C65500 with a silicon composition ranging from 2.8% to 3.8%, C64200 and C65100.

6. The disc drive storage system as in claim 3, further comprising a counter surface to the silicon containing copper alloy selected from the group consisting of stainless steel including SF20T and 430SS.

7. The disc drive storage system as in claim 1, further comprising:
   a stator that is fixed with respect to the housing; and
   a rotor supported by the rotatable component and magnetically coupled to the stator.

8. A spindle motor comprising:
   a housing having a central axis;
   a stationary component that is fixed with respect to the housing and coaxial with the central axis;
   a rotatable component that is rotatable about the central axis with respect to the stationary component; and
   a bearing defining a gap and interconnecting the stationary component and the rotatable component and having surfaces separated by a lubricant, wherein at least one of the stationary component and the rotatable component is substantially comprised of silicon containing copper alloy, wherein the silicon containing copper alloy consists of silicon bronze.

9. The spindle motor as in claim 8, wherein one of the stationary component and the rotatable component comprises one of a shaft, sleeve, hub, counterplate, thrustplate, conical shaft, and a conical sleeve.

10. The spindle motor as in claim 8, wherein the silicon containing copper alloy is a wear resilient material for achieving negligible adhesive and abrasive wear to components, desired bearing gap dynamic performance, and component corrosion resistance.

11. The spindle motor as in claim 8, wherein the silicon bronze has a silicon composition ranging from 0.2% to 10%.

12. The spindle motor as in claim 8, wherein the silicon bronze is one of high-silicon bronze A having product description C65500 with a silicon composition ranging from 2.8% to 3.8%, C64200 and C65100.

13. The spindle motor as in claim 10, further comprising a counter surface to the silicon containing copper alloy selected from the group consisting of stainless steel including SF20T and 430SS.

14. The spindle motor as in claim 8, further comprising:
   a stator that is fixed with respect to the housing; and
   a rotor supported by the rotatable component and magnetically coupled to the stator.

15. A motor comprising a housing having a central axis, a stationary component that is fixed with respect to the housing and coaxial with the central axis, a rotatable component that is rotatable about the central axis with respect to the stationary component, a bearing defining a gap and interconnecting the stationary component and the rotatable component and having surfaces separated by a lubricant, and a means for achieving negligible adhesive wear and negligible abrasive wear to motor components wherein at least one of the stationary component and the rotatable component is substantially formed of silicon containing copper alloy, wherein the silicon containing copper alloy consists of silicon bronze.

16. The motor as in claim 15, wherein one of the stationary component and the rotatable component comprises one of a shaft, sleeve, hub, counterplate, thrustplate, conical shaft, and a conical sleeve.

17. The motor as in claim 15, wherein means for achieving negligible adhesive wear and negligible abrasive wear is included in at least one of the rotatable component and the stationary component.

18. The motor as in claim 17, wherein the silicon bronze has a silicon composition ranging from 0.2% to 10%.

19. The motor as in claim 17, wherein the silicon bronze is one of high-silicon bronze A having product description C65500 with a silicon composition ranging from 2.8% to 3.8%, C64200 and C65100.

20. The motor as in claim 15, further comprising a counter surface to the silicon containing copper alloy, the counter surface selected from the group consisting of stainless steel including SF20T and 430SS.

21. The motor as in claim 15, further comprising a stator that is fixed with respect to the housing, and a rotor supported by the rotatable component and magnetically coupled to the stator.

* * * * *